(12) United States Patent
Dwyer

(10) Patent No.: US 11,580,068 B2
(45) Date of Patent: Feb. 14, 2023

(54) SYSTEMS AND METHODS FOR CLIENT-SIDE DATA ANALYSIS

(71) Applicant: Palantir Technologies Inc., Palo Alto, CA (US)

(72) Inventor: William Dwyer, Seattle, WA (US)

(73) Assignee: Palantir Technologies Inc., Palo Alto, CA (US)

( * ) Notice: Subject to any disclaimer, the term of this patent is extended or adjusted under 35 U.S.C. 154(b) by 545 days.

(21) Appl. No.: 15/844,110

(22) Filed: Dec. 15, 2017

(65) Prior Publication Data

US 2019/0188282 A1 Jun. 20, 2019

(51) Int. Cl.
| | |
|---|---|
| *G06F 16/248* | (2019.01) |
| *G06F 16/14* | (2019.01) |
| *G06F 16/951* | (2019.01) |
| *G06F 16/11* | (2019.01) |
| *G06F 3/0483* | (2013.01) |

(52) U.S. Cl.
CPC .......... *G06F 16/156* (2019.01); *G06F 16/116* (2019.01); *G06F 16/248* (2019.01); *G06F 16/951* (2019.01); *G06F 3/0483* (2013.01)

(58) Field of Classification Search
CPC .... G06F 16/156; G06F 16/248; G06F 16/116; G06F 3/0483; G06F 3/00; G06F 16/951
USPC ........................................................ 707/722
See application file for complete search history.

(56) References Cited

U.S. PATENT DOCUMENTS

| | | | | |
|---|---|---|---|---|
| 9,686,086 B1* | 6/2017 | Nguyen | ................ | H04L 67/141 |
| 2005/0081105 A1* | 4/2005 | Wedel | .................... | G06F 9/451 |
| | | | | 714/38.14 |
| 2008/0201748 A1 | 8/2008 | Hasek et al. | | |
| 2009/0007101 A1 | 1/2009 | Azar et al. | | |
| 2010/0268691 A1* | 10/2010 | Grinstein | ............ | G06F 9/44521 |
| | | | | 707/682 |
| 2013/0275381 A1 | 10/2013 | De Schrijvr et al. | | |
| 2014/0282163 A1 | 9/2014 | MacKinlay et al. | | |
| 2015/0324371 A1 | 11/2015 | Guo | | |

(Continued)

OTHER PUBLICATIONS

Zaharia (https://www2.eecs.berkeley.edu/Pubs/TechRpts/2011/EECS-2011-82.pdf; Jul. 2011; Technical Report No. UCB/EECS-2011-82 (Year: 2011).*

(Continued)

*Primary Examiner* — Hosain T Alam
*Assistant Examiner* — Tracy M McGhee
(74) *Attorney, Agent, or Firm* — Sheppard Mullin Richter & Hampton LLP

(57) ABSTRACT

Systems and methods are provided for analyzing data in one or more datasets, where the one or more datasets are embodied as local, embedded databases in a client-side application, such as a web browser or web browser tab. A client-side data analysis application or artifact may be used to interact, i.e., query, the local, embedded databases, and retrieve results to analyze data. Because the one or more datasets are localized, there is no need to access a remote database/datastore in order to analyze the data. Moreover, the client-side data analysis application or artifact can be executed as individual instances in the client-side application. The state of a local, embedded database may be stored as another file that can be used as a local, embedded database for another instance of the client-side data analysis application or artifact.

18 Claims, 9 Drawing Sheets

(56) References Cited

U.S. PATENT DOCUMENTS

2016/0134723 A1 5/2016 Gupta et al.
2017/0206372 A1 7/2017 Jung
2017/0262196 A1 9/2017 Hirose

OTHER PUBLICATIONS

Zaharia et al., "Resilient Distributed Datasets: A Fault-Tolerant Abstractions for In-Memory Cluster Computing," Proceedings of the 9th USENIX Conference on Networked Systems and Design and Implementation, 2012, 14 pages.
Extended European Search Report for EP Appln. No. 18212213.5 dated Feb. 25, 2019, 10 pages.
Kennedy et al., "Pocket Data: The Need forTPC-Mobile", Sep. 4, 2015, International Conference on Simulation, Modeling, and Programming for Autonomous Robots, Simpar 2010, pp. 8-25.
Anonymous, "Position Needed Browser Tab(s) Quickly", IP.Com Journal, IP.Com Inc., Sep. 20, 2016, 5 pages.
Wikipedia: "Database", Dec. 19, 2012, 28 pages, Retrieved from the Internet: https://en.wikipedia.org/w/index.php?title=Database&oldid=528573103.

\* cited by examiner

| Date | Duration | Phone Number | Call Type |
|---|---|---|---|
| 2-24-2017 | 15 min | 619-000-0000 | Landline |
| 2-24-2017 | 22 min | 619-444-4444 | Landline |
| 1-13-2017 | 25 min | 858-222-2222 | Wireless |
| ••• | ••• | ••• | ••• |

200

FIG. 2A date,duration,phone number,call_type
2-24-2017,15min,619-000-0000,landline
2-24-2017,22min, 619-444-4444,landline
1-13-2017,25min,858-222-2222,wireless
•••

FIG. 2B

SYSTEMS AND METHODS FOR CLIENT-SIDE DATA ANALYSIS

TECHNICAL FIELD

This disclosure relates to approaches for analyzing data on a local client.

BACKGROUND

Ad-hoc data analysis can refer to an analysis process designed to answer a specific question or query. The product of an ad-hoc data analysis is often a statistical model, analytic report, and/or some other form of data summary. For example, ad-hoc data analysis may be used to drill deep into a dataset to obtain particular details about some record(s) in the dataset. Conventional data processing applications and/or artifacts are often loaded from a server over some data network, and the data to be analyzed may also be maintained on a server (e.g., the same server that provided the data processing applications and/or artifacts). Accordingly, conventional instantiations of analysis artifacts require installing client-side applications (e.g., the data processing application), as well as initiating and/or maintaining some form of connectivity with a server over a network.

SUMMARY

A claimed solution rooted in computer technology overcomes problems specifically arising in the realm of computer technology. In various implementations, a computing system executes a client-side data analysis artifact, the client-side data analysis artifact being executed in a client-side application (e.g., a web browser, tab of a web browser, etc.). The client-side data analysis artifact may comprise a local, embedded database compiled in low-level byte code (e.g., assembly code, machine code, etc.), in addition to one or more user interface applications or tools for performing the data analysis on the embedded database. This may, for example, provide performance advantages relative to interpreted languages, such as JavaScript. That is, a user may import data, e.g., the database to be embedded, into the client-side application. The computing system may receive a data analysis query via the client-side application, and process the data analysis query using the client-side data analysis artifact.

Various embodiments of the present disclosure include systems, methods, and non-transitory computer readable media configured to execute a client-side data analysis artifact, the client-side data analysis artifact being executed in a client-side application, the client-side data analysis artifact comprising a local, embedded database. A data analysis query is received. The data analysis query is processed using the client-side data analysis artifact. A result of the data analysis query is stored in the local embedded database. A state of the local embedded database is captured. The captured state of local embedded database is exported.

In some embodiments, the client-side application comprises a web browser.

In some embodiments, the local, embedded database is compiled in low-level byte code.

In some embodiments, the systems, methods, and non-transitory computer readable media are configured to execute a second client-side data analysis artifact, the second client-side data analysis artifact being executed in a second client-side application, the second client-side data analysis artifact comprising a second local embedded database compiled in low-level byte code.

In some embodiments, the systems, methods, and non-transitory computer readable media are configured to import the local, embedded database in the captured state, the captured state of the local, embedded database being imported in response to user interaction with the second client side application; and presenting the captured state of the local, embedded database.

In some embodiments, the systems, methods, and non-transitory computer readable media are configured to receive a second data analysis query; process the second data analysis query using the client-side data analysis artifact and the local, embedded database from its captured state; and store a result of the second data analysis query in the local, embedded database, wherein the state of the local, embedded database is updated based upon the result of the second data analysis query.

In some embodiments, the client-side data analysis artifact comprises a first instance of the client-side data analysis artifact, and the second client-side data analysis artifact comprises a second instance of the client-side data analysis artifact. In some embodiments, the first instance of the client-side data analysis artifact is executed in a first web browser tab. In some embodiments, the second instance of the client-side data analysis artifact is executed in a second web browser tab.

In some embodiments, the systems, methods, and non-transitory computer readable media are configured to export the captured state of the local, embedded database to a file on the system.

In some embodiments, the systems, methods, and non-transitory computer readable media are configured to export the captured state of the local, embedded database to a remotely located data server.

In some embodiments, the client-side data analysis artifact comprises a data visualization tool adapted to render the result of the data analysis query in at least one of a graphical manner and a tabular manner.

In some embodiments, the systems, methods, and non-transitory computer readable media are configured to convert a file comprising data to which the data analysis query is applied into the local, embedded database.

In some embodiments, the system comprises a standalone, end-user system without an active network connection.

These and other objects, features, and characteristics of the systems and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

FIG. 2A is an example representation of a tabular dataset that can be analyzed in accordance with various embodiments of the present disclosure.

FIG. 2B is an example representation of the database of FIG. 2A formatted in a CSV format.

DETAILED DESCRIPTION

Figure 1A:
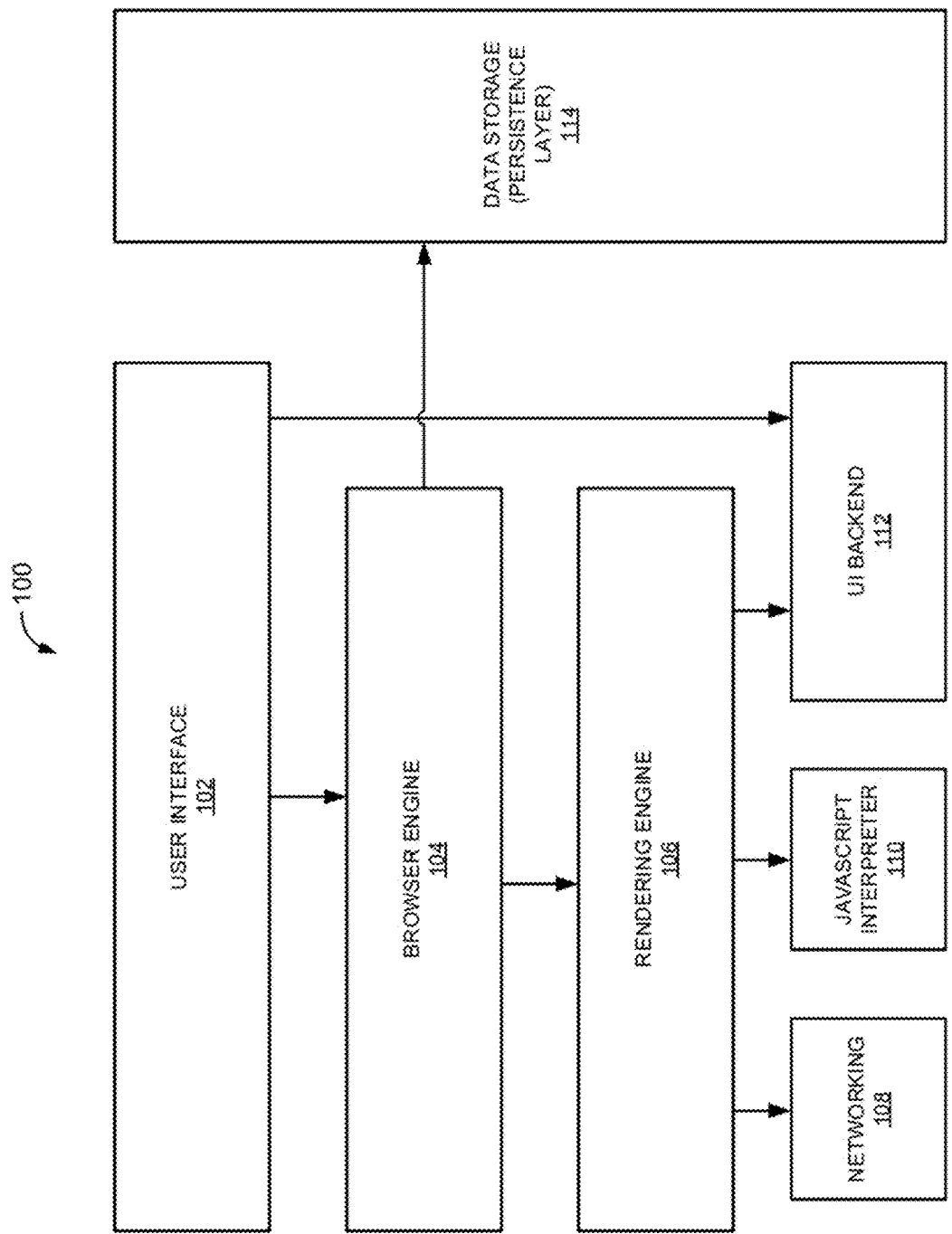
FIG. 1A illustrates an example web browser architecture.

Under conventional approaches, data analysis platforms are often based on client-server database systems. For example, a data analysis platform may include a server executing a database management system, and client systems may interact (e.g., submit queries) with the database management system over a communication network (e.g., the Internet). The client systems may interpret client-side scripts to interact with the database management system over the communication network. However, such data analysis platforms typically require persistent and/or reliable network connections between the server and client systems, and suffer performance drawbacks by relying on interpreted client-side scripts.

A claimed solution rooted in computer technology overcomes problems specifically arising in the realm of computer technology. In various implementations, a computing system executes a client-side data analysis artifact, the client-side data analysis artifact being executed in a client-side application (e.g., a web browser, tab of a web browser, etc.). The client-side data analysis artifact may comprise a local, embedded database compiled in low-level byte code (e.g., assembly code, machine code, etc.), in addition to one or more user interface applications or tools for performing the data analysis on the embedded database. This may, for example, provide performance advantages relative to interpreted languages, such as JavaScript. That is, a user may import data, e.g., the database to be embedded, into the client-side application. The computing system may receive a data analysis query via the client-side application, and process the data analysis query using the client-side data analysis artifact.

In some embodiments, the computing system may also store a result of the data analysis query in the local, embedded database. In some embodiments, the computing system may capture a current state of the local, embedded database, and export the state of the local, embedded database. For example, the captured state may be transferred to a remote database as a file and/or set of files. In some embodiments, the captured state may be imported into another instantiation of the client side data analysis artifact. In this way, a user may execute another instantiation of the client-side data analysis artifact from another client-side application, or at a different time, and be able to pick up where he/she left. Some or all of these functions may be performed locally, without requiring an active network connection.

In some embodiments, visualizations may be generated based on the results of the data analysis query. Operations may be performed within those visualizations to allow a user to further analyze the dataset(s). For example, filters may be applied to and/or removed from the visualizations to allow a user to further drill down into a dataset(s), data in the dataset(s) may be sorted, data in the dataset(s) may be aggregated or grouped according to various factors/parameters, etc. In this way, a user can take advantage of viewing/consuming data from different perspectives. The visualizations may be generated using one or more visualizations tools that can also be built into the client-side data analysis artifact.

Example Data Analysis System and Data Architecture

As previously discussed, various embodiments are directed to a client-side data analysis artifact that can be executed in a client-side application. An example of a client-side application in which the disclosed client-side data analysis artifact is a browser tab. As also previously discussed, the advantage of executing the client-side data analysis artifact in a browser tab (or other client-side application) negates the need for a remotely located database server that houses the data to be analyzed, as well as persistent communications between a conventional data analysis application executing on a client and the database server. Furthermore, no additional software installation is needed in order to use the client-side data analysis artifact in the browser tab. Thus, even if permissions, or lack thereof, prevent a user from installing native software in their environment (e.g., without administrator approval), the client-side data analysis artifact may still be executed.

Before describing the client-side data analysis artifact in detail, it is useful to describe an example client-side application, such as a web browser/web browser tabs, within which the client-side data analysis artifact may be executed. Web browsers (or browsers) are configured to present a web resource selected by a user, e.g., a web page requested from a web server. The web resource may be a document formatted as a hypertext markup language (HTML) document or format, an image or other media content, etc. A user specifies a uniform resource identifier that the web browser can use to locate the desired web resource. A web browser can interpret and display the web resource, e.g., interpret and display an HTML file.

FIG. 1A illustrates an example web browser architecture, and its main components or elements. Web browser 100 may include a user interface (UI) 102, a browser engine 104, a rendering engine 106, a networking component 108, a JavaScript interpreter 110, a UI backend 112, and a data storage component 114.

User interface 102 can include user/graphical elements with which a user can interact, e.g., navigate to/from/within web pages. User interface 102 can include, for example, the address bar, back/forward button, bookmarking menu, etc. Every part of a web browser's display except the window in which the user sees a web page may be included as part of user interface 102.

Browser engine 104 marshals actions between UI 102 and rendering engine 106 so that rendering engine 106 can display requested content. Following the above example, a user may request an HTML document to be displayed in the web browser 100. Accordingly, rendering engine 106 parses HTML and cascading style sheets (CS S) code in order to display the requested HTML document in accordance with the CSS code.

Networking component 108 may be used for network calls, such as hypertext transfer protocol (HTTP) requests, using different implementations for different platforms behind a platform-independent interface. JavaScript interpreter (engine) 110 can be used to parse and execute JavaScript code. Web browsers, such as web browser 100 may use application programming interfaces (APIs) to create host objects responsible for reflecting Document Object Model (DOM) into JavaScript. Many web-based applications are written in JavaScript. Backend component 112 can be used for drawing basic widgets like combo boxes and windows. UI backend component 112 exposes a generic interface that is not platform specific, while using operating system user interface methods.

Data storage 114 is a persistence layer for storing data that should remain after the process with which it was created has ended. For example, web browser 100 may need to locally save data, such as cookies. In order to achieve persistence, web browser 100 can use any underlying DBMS dovetailing neatly with the client-side data analysis using a local, embedded database disclosed herein.

A tabbed interface refers to a graphical control element that allows multiple documents or panels to be contained within a single window. For example tabs in web browsers, such as web browser 100 can be used as a navigational widget for switching between web resources, documents, pages, etc. In web browsers, such as web browser 100, tabs run in separate processes.

Figure 1B:
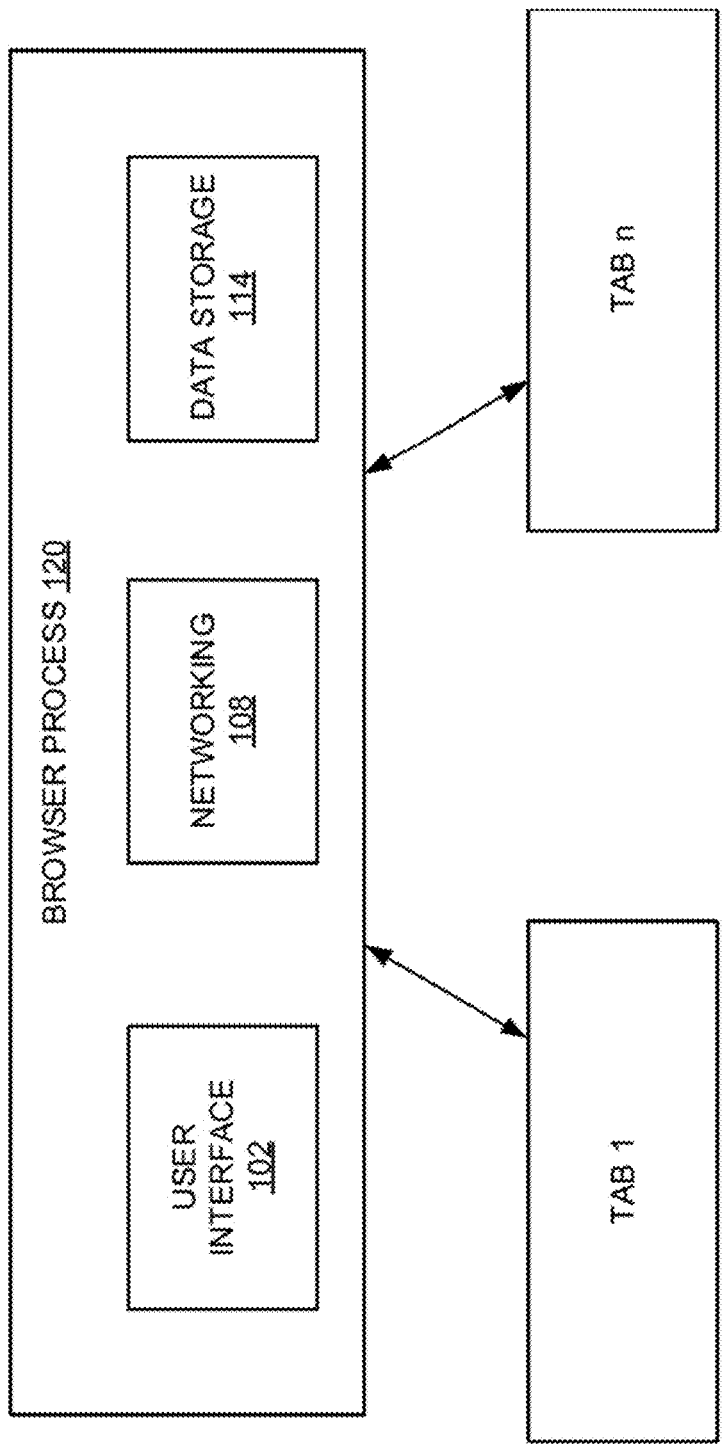
FIG. 1B illustrates an example implementation of tabs in the web browser of FIG. 1A.

FIG. 1B illustrates an example implementation for web browser tabs. As noted above, each tab may be implemented by an instance of rendering engine 106. Each rendering process associated with a tab, e.g., tab 1 or tab n, communicates with the "main" browser or kernel process, e.g., browser process 120 that can encompass user interface 102, networking via networking component 108, and data via data storage component 114. It is common for each rendering process to be executed within a sandboxed environment for security purposes. For example, accessing a corrupt web resource on one tab should not impact another tab, or the web browser/computer. Each tab, e.g., tab 1, communicates with the browser process 120 via inter-process communication.

Figure 1C:
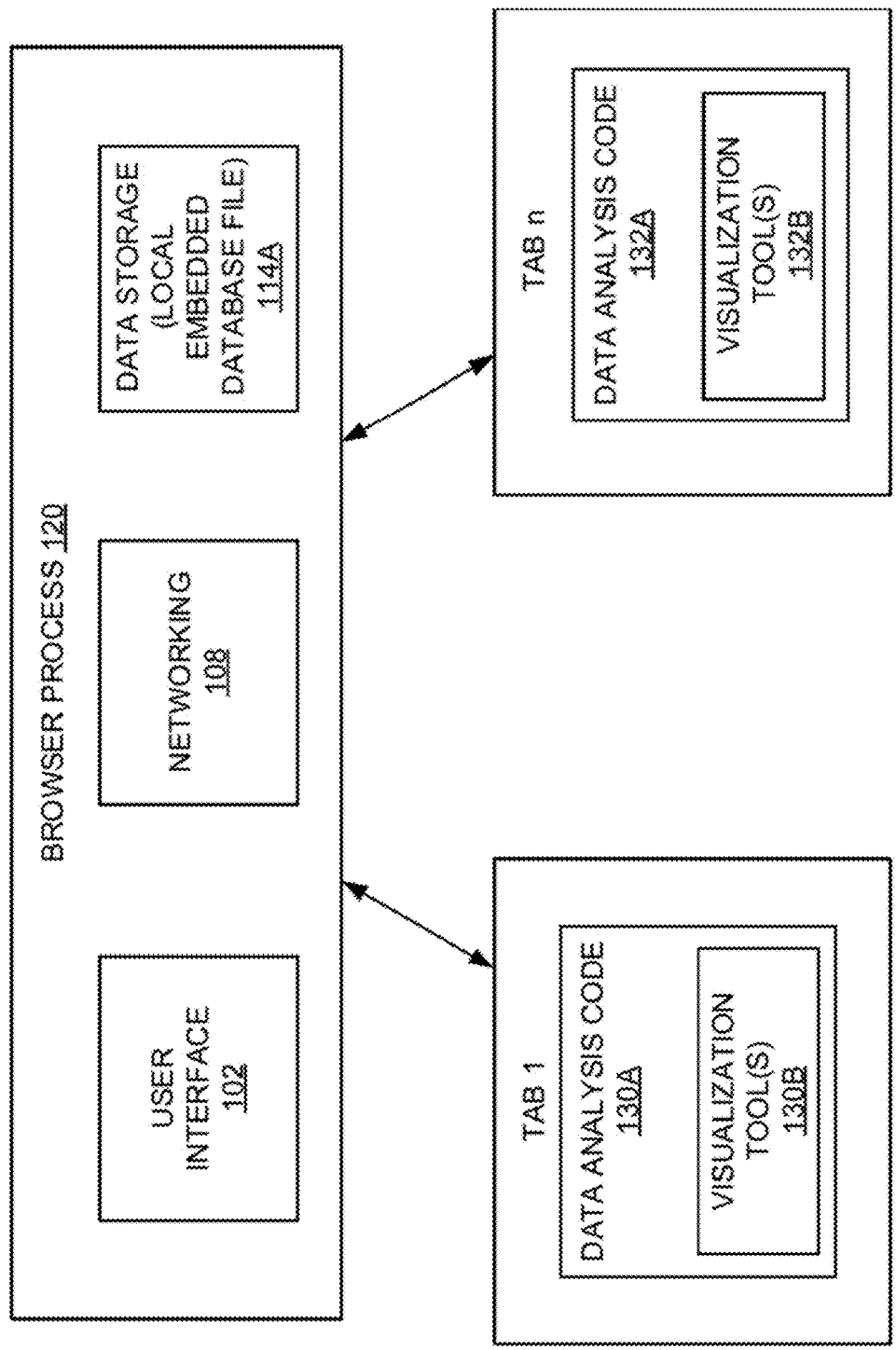
FIG. 1C illustrates an example implementation of client-side data analysis in the web browser of FIG. 1A.

To achieve client-side data analysis in accordance with various embodiments, the client-side data analysis artifact is contained within the client-side application, such as a web browser tab. Moreover, the client-side data analysis artifact performs its data analysis with respect to a local, embedded database file(s) that can be maintained in the client-side application, such as the web browser. Accordingly, as illustrated in FIG. 1C, data storage component 114A may comprise a local, database file, which in some embodiments can be a SQLite database file. Each tab may contain an instance of data analysis code, e.g., code 130A in tab 1 and code 132A in tab n. The data analysis code may be embodied as instances of the client-side data analysis artifact. Data storage component 114A can be accessed by the web browser, per-tab API, e.g., localStorage API, and used to communicate between instances of the client-side data analysis artifact or share copies of the database file.

Moreover, visualization tools, e.g., tools configured to render visualizations such as charts, histograms, etc., based on search results of one or more queries using the client-side data analysis artifact, may be implemented in each tab as well. In this way, each instance of the client-side data analysis artifact and the resulting data analysis is "self-contained." Web browser 100 need not access any remotely located datastore/database, and hence, no connectivity over a network is needed (although it is possible to communicate with another network entity, e.g., when exporting datasets, or if a user is initially obtaining a dataset from a network location to import). Once a tab is closed, that particular client-side data analysis artifact instance ends. It should be noted that in some embodiments, data analyzes performed in different tabs, e.g., tab 1 and tab n, remain separate (in line with most web browsers' desire to keep processes within a tab separate). However, in some embodiments, client-side data analysis artifacts instances may be allowed to communicate, e.g., if each tab is analyzing the same dataset, or some other determined condition(s).

Data analysis code 130A/132A may include a component that presents a data analysis query interface with which a user may input a query, e.g., one or more terms reflecting a data analysis query for data of interest that will be applied to the local, database file 114A. The data analysis query interface may further present one or more options for visualization of the search results.

In some embodiments, data analysis code 130A/132A may include a session manager for storing a result of a data analysis query in local, database file 114A. In some embodiments, the session manager may store a state of the local, database file 114A for later use or exporting, e.g., to another tab in which an instance of the client-side data analysis query artifact is running e.g., from tab 1 to tab n.

In some embodiments data analysis code 130A/132A may comprise a query builder that receives user input, e.g., textual input reflecting the data analysis query for some data of interest, and create a query that can be applied to the local, embedded database.

When the results of a query are returned, one or more visualization tools 130B/132B can be used to produce graphics or other visual representation(s) illustrating the results. For example, visualization tool 130B may receive query results from local, database file 114A. In some embodiments, visualization tool 130B may receive a list of data fields and data elements/values corresponding to those data fields.

For example, visualization tool 130B may produce a table of query results for display. Visualization tool 130B may organize the results in rows with each column corresponding to a particular data field type. For example, a table may include columns for first name, last name, account number, institution, and date. In some embodiments visualization tool 130B may rearrange, organize, and sort the table based on user input.

In some embodiments, visualization tool 130B may produce a chart for display. Based on the query results, visualization tool 130B may automatically compute values for a chart. Predefined graph formats, such as pie charts, bar charts, histograms, and link maps, may allow visualization tool 130B to autonomously display relevant graphs.

Visualization tool 130B may allow a user to select a column of a table of results. Based on the format of the field of the selected column, visualization tool 130B may determine which type of graph to display. For example, for a column that corresponds to a date field, v visualization tool 130B may generate a histogram illustrating the distribution of the query results over time. The size of the divisions of the histogram may be adjustable and/or predefined by settings. For example, settings may define that the histogram should include only twelve time sections, regardless of the length of the time period of results. In another example, a user may select a column related to a field that comprises text-based categories, such as institution names. By tallying the number of results for each institution name appearing in the query results, visualization tool 130B may automatically generate a pie chart or chart of the tallies.

In an embodiment, visualization tool 130B may generate a network. The network may include icons for entities (e.g., institutions from which documents originated and persons mentioned in the documents) and documents. Responsive to a user selection of a particular entity, visualization tool 130B may display lines corresponding to the documents related to that entity; the documents may, in turn, link to other entities. Thus, visualization tool 130B may present a straight forward graphic for determining the path of documents and related parties.

In some embodiments, visualization tool 130B may render a map for display. Responsive to a user selection of a particular entity, action, or other data of interest or aspect of a data of interest, a map may be generated reflecting where the particular entity is, has been, etc. For example, a user may wish to view where a particular entity has visited based on credit card transactions. In some embodiments, the map may be generated relative to a desired geographical region and/or level of granularity, e.g., at a city-level, state-level, country-level, etc. In some embodiments, the map may be a heat map, color shading, or other visual augmentation(s) applied to the map reflecting a level of interaction, e.g., how long the entity spent at a particular location, the frequency with which the particular entity visited a particular location, etc.

In some embodiments, the local, embedded database may be a SQLite database complied and running in a low level language, one example of which is WebAssembly. SQLite refers to an in-process library that implements a relational database management system or engine. Because SQLite is an embedded database that can read/write to its memory space and/or a disk file, no separate server process(es) is needed. WebAssembly is an example of a low level bytecode format for in-browser client-side scripting, hence the ability to implement the client-side data analysis artifact in a client-side application (e.g., a web browser, tab of a web browser, etc.). A toolchain can be used to compile C/C++ (e.g., SQLite, RDBMS) into WebAssembly, allowing the local, embedded database to be implemented in, e.g., a web browser tab, along with any visualization tools.

Conventionally, applications, code, etc. for web browsers are written in JavaScript. However, the use of WebAssembly, which is already supported by and/or gaining support in various web browsers, allows for fast code execution when compared to execution of JavaScript code. WebAssembly refers to a low level, binary format for delivery asm.js code that can be understood by and used in web browsers. Accordingly, binary bundles can be smaller than that which can be achieved using JavaScript. Smaller bundles result in faster delivery/execution. This may be especially useful in the case of large code bases, mobile devices, and the like.

In operation, a user may load a dataset, such as a comma-separated values (CSV) file into a web browser. A CSV file is a file format that can be used to store tabular data, such as a spreadsheet, database, etc. A CSV file comprises data fields that are often separated or delimited by a comma. FIG. 2A illustrates an example of tabular data that can be represented in a CSV file, and FIG. 2B illustrates an example of the tabular data represented in a CSV-formatted file.

As illustrated in FIG. 2A, tabular data 200 comprises data associated with phone calls: date data; duration data; phone number; and call type. In tabular form, each of the aforementioned types of data represent columns. The data itself (call records) populate rows accordingly. As illustrated in FIG. 2B, in the CSV format, each row of data (each phone record) includes a data element separated by a comma.

A SQLite table may be created for the CSV file. In the event the user loads a plurality of datasets, a SQLite table can be created for each of the datasets. In some embodiments, multiple, compatible datasets can be concatenated into a single SQLite table. The user can instruct how the dataset, e.g., CSV file, should be interpreted and formatted. That is, the user can specify which fields in a CSV file are to be reflected as columns/rows in the resulting SQLite table. Following the above example, a CSV file may contain phone records that include the data when a phone call was made, the duration of the phone call, the phone number (in this case, of a caller), and the type of call (e.g. whether the phone call was made using a wireless device or over a landline). A first row of the CSV file may be used as column names for the resulting SQLite table, while subsequent rows of the CSV file can be used to populate the SQLite table (as illustrated in FIG. 2A).

Once the SQLite table(s) has/have been created, the user can interact with the dataset(s) using the client-side data analysis artifact to perform a search for some data of interest in the dataset(s). For example, a data analysis query may be performed for a known phone number of a person of interest in an investigation. The user may then have the option of rendering one or more visualizations, displaying the table itself, displaying a chart representative of the search results, displaying a map representative of some aspect(s) of the search results.

The visualizations that can be rendered depend on what visualization tools are implemented in the web browser. For example, a chart visualization tool can be developed and used to render a chart using the first column (in the above example, date data) as data to be shown on the x-axis, while the second column (duration data) is used as data to be shown or plotted on the y-axis. It should be noted that various types of visualizations can be rendered including, but not limited to, e.g., heat-maps, link maps, line charts, histograms, timelines, etc. that provide a visual representation of the search results. A user may further interact with the visualization(s), e.g., focusing on certain data presented with the visualization(s).

Example Data Analysis and Visualization Rendering

Figure 3A:
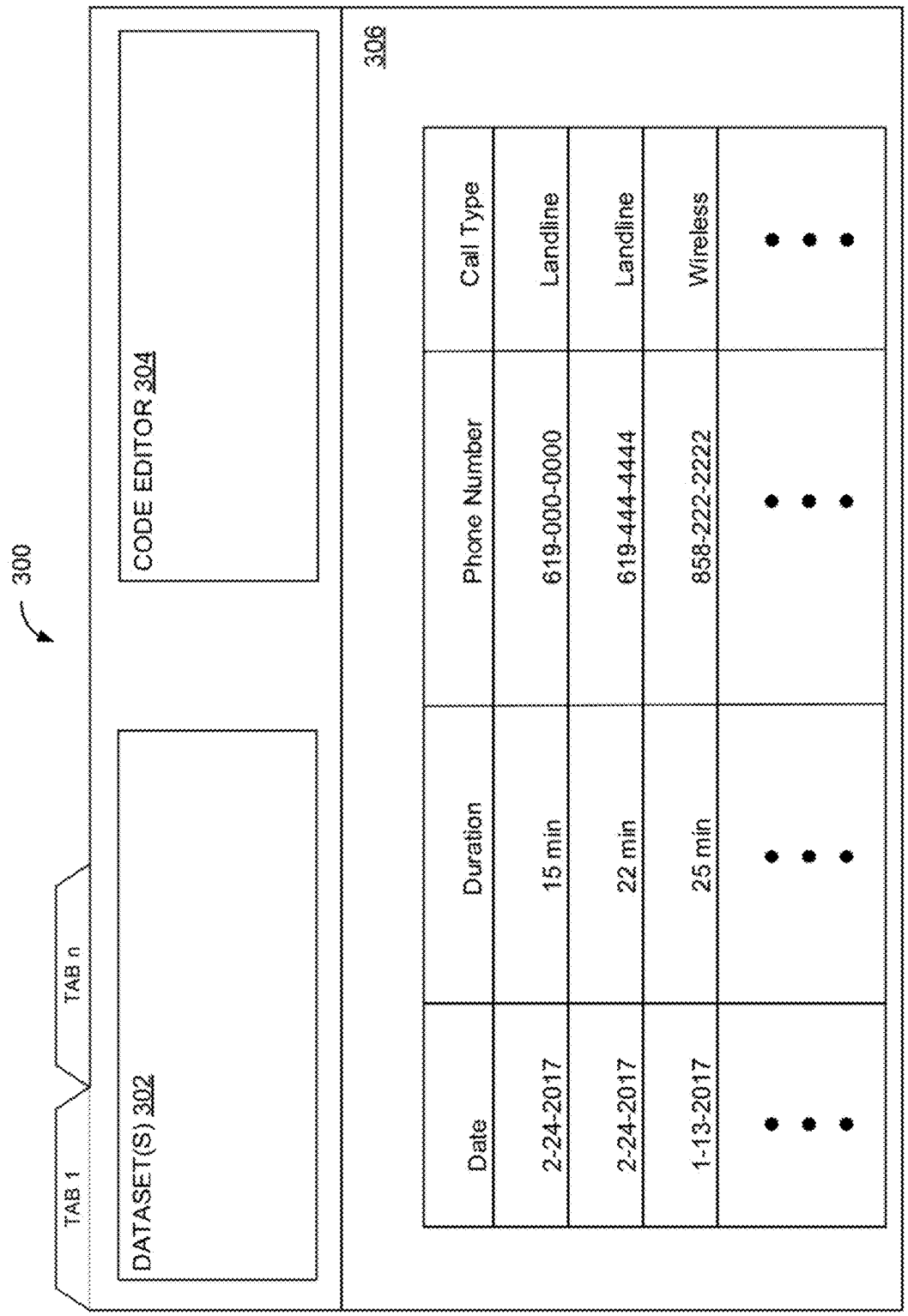
FIG. 3A illustrates an example data analysis tool implementation in a web browser tab in accordance with one embodiment.
Figure 3B:
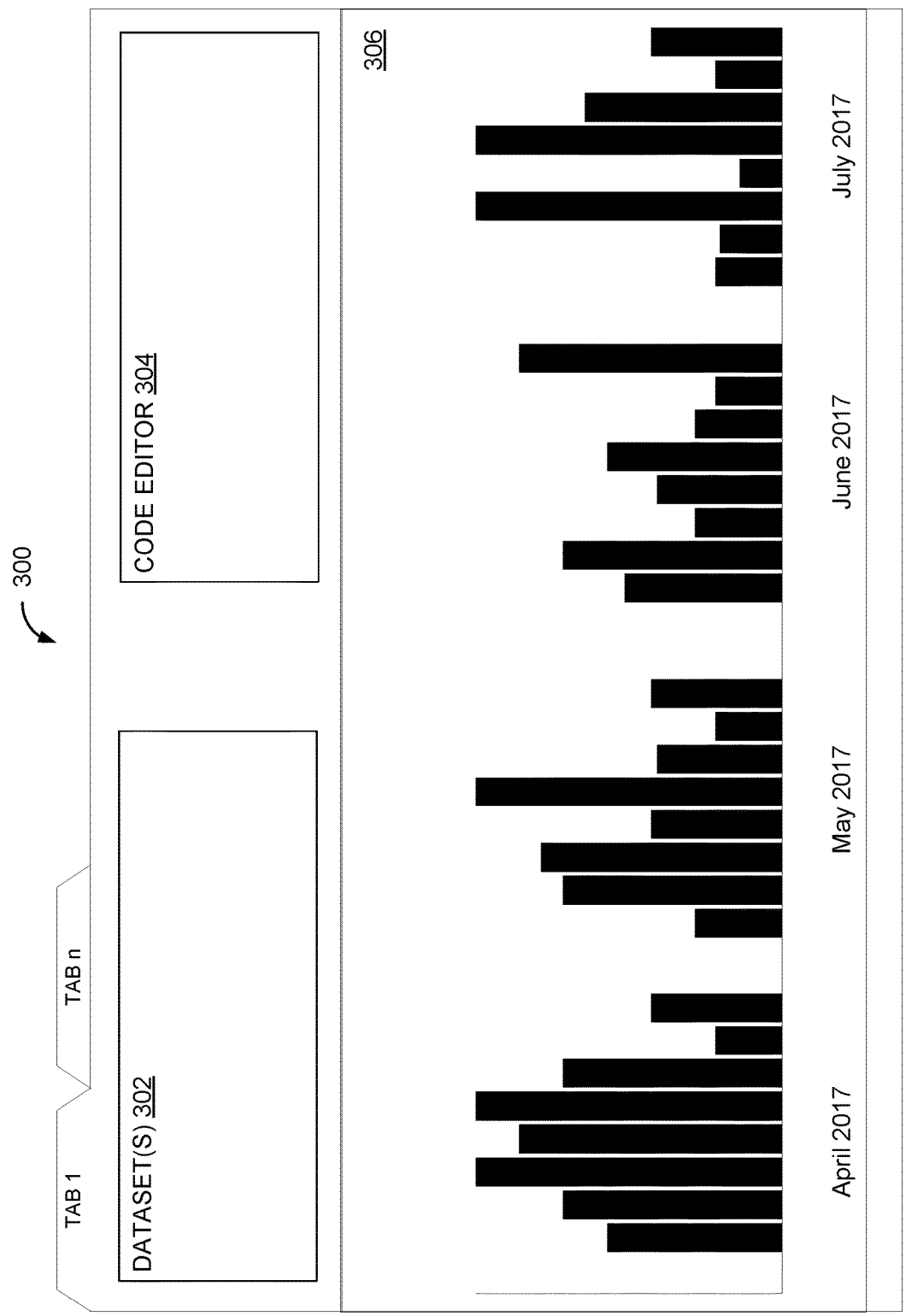
FIG. 3B illustrates a first data analysis visualization of the example data analysis tool of FIG. 3A.
Figure 3C:
FIG. 3C illustrates a second data analysis visualization of the example data analysis tool of FIG. 3A.

FIGS. 3A-3C illustrate examples of data analysis and visualization rendering in accordance with some embodiments of the present disclosure. As illustrated in FIG. 3A, user interface 300 may include various display regions, selection regions, and/or input fields. In some embodiments, user interface 300 can be provided by a web-based application, e.g., a client-side data analysis artifact instantiated on a web browser tab. User interface 300 may be one embodiment of user interface 102 of FIG. 1A.

A dataset(s) field 302 may be used to input or select a dataset from which data may be analyzed. In some embodiments, the user may specify a dataset, such as in this example, a subpoena-ed set of phone records. As noted above, the phone records may be formatted as a CSV file. The CSV-formatted phone records file may be stored locally on a computer system (e.g., computer system 500) on which a web browser (e.g., web browser 100) is running. In some embodiments, the user may download the CSV-formatted phone records file from a remote location, e.g., server (such as server 530). To import the CSV-formatted phone records file in the client-side data analysis artifact, the user may simply drag-and-drop the CSV-formatted phone records file into dataset(s) field 302. The user may specify more than one dataset if desired. Dataset(s) field 302, in some embodiments may be a field in which the user can enter a search for relevant datasets that computer system 500 may have access to. Dataset(s) field 302 may also display the selected dataset(s) for reference by the user.

Code editor field 304 of user interface 300 may allow a user to input and/or edit code in order to facilitate query creation. As noted above, a user may enter query terms and specify a query to be applied to the dataset(s) to be analyzed. It should be noted that because the client-side data analysis artifact and the local, embedded database (i.e., the dataset(s) to be analyzed) are running on WebAssembly, a user can specify/create user defined functions in JavaScript and use them a SQLite query.

After a query has been performed, search results may be presented in a data presentation field 306. In the example illustrated in FIG. 3A, the results of a query comprise certain phone records matching the parameters/conditions set forth in a query input into code editor field 304. It should be noted that data presentation field 306 may also present certain information regarding the one or more datasets to be analyzed. For example, data presentation field 306 may present the number of data elements, e.g., phone records in this example, in the dataset.

In the illustrated example of FIG. 3A, a selected callee phone number "858-555-5555" may be the specified subject of interest, and the relevant dataset may be the aforementioned phone records dataset, of which some subset is related to the specified callee phone number. In some embodiments, a user may select alternative datasets for further analysis, or may select multiple datasets for further analysis (where a combination of query results can be presented at once). A cursor or other mechanism for effectuating user input/ selection may be used in accordance with various embodiments, e.g., a peripheral device such as a mouse, a touchscreen, voice, etc.

Data presentation field 306 may be an area in which the results of a query can be displayed. In this example, based on the query regarding callee phone number 858-555-5555, every phone record within the phone record dataset that corresponds to a caller phone number calling the callee phone number is displayed. The amount of information that can be presented may vary, and may be specified by the user or can be a function of the data (or metadata) stored in (associated with) the dataset. In this case, the dataset has information regarding the date of each call to the callee phone number, the duration of each call to the callee phone number, the caller phone number that called the callee phone number, and the type of call made to the callee phone number, e.g., wireless or landline.

As shown in FIG. 3A, data presentation field 306 may render the search results as a table of cells. Each row may correspond to a specific data element(s) resulting from a search query, while the columns may be coordinated to show the fields relevant to the dataset (e.g., based on the CSV-formatted phone records file) (FIGS. 2A, 2B). The columns may be sortable based on the data contained in the corresponding cells from high to low, alphabetically, or based on character values, depending upon the format of the data contained in the field. In some embodiments, fields and/or certain data may be flagged, tagged, or otherwise associated with some status of interest. A user may sort the data/records based on, e.g., the total number of flags associated with a data element(s) or based on particular combinations of flags. In some embodiments, data presentation field 306 may allow a user to select a given cell to provide additional data. For example, selection of the cell displaying caller phone number 858-222-2222 may result in additional information being displayed, additional searches being initiated, highlighting of the cell to draw a user's attention, etc.

As noted above, various embodiments of the present disclosure allow a user to select a visualization to represent the results of a data analysis query in another manner. Although some types of visualizations are shown and/or discussed herein, such as timelines, heatmaps, charts, etc., it should be understood that any number of visualizations may be presented as options to the user. Again, the types of visualizations that can be rendered depends merely on whether a visualization tool has been developed/is available for use as part of a client-side data analysis query artifact. In some embodiments, once an individual visualization has been selected by a user, and data has been rendered according to the visualization, the user may have the option to supplement the visualization with one or more additional visualizations, interact with the visualization(s) by focusing on a particular, desired aspect of the visualization(s), etc.

FIG. 3B illustrates another example visualization which may comprise a chart visualization, which may be generated by a chart visualization tool, which may be an embodiment of visualization tool(s) 130B/132B. In this example, the chart visualization tool may also parse the query results to determine the relevant data upon which the visualization is to be based. In some embodiments, the visualization may be automatically generated based upon a "generic" configuration. For example, the chart visualization tool may render a chart using a first column/data filed (in the above example, date data) as data to be shown on the x-axis, while the second column (duration data) is used as data to be shown or plotted on the y-axis.

In other embodiments, the chart visualization tool may allow for the user to specify certain conditions, parameters, etc. in order to focus the chart on that data that is of interest to the user. For example, the chart visualization tool may represent the number calls made (by each caller phone number) to the callee phone number per month. In some embodiments, the chart visualization tool may be coded in a way that automatically generates a chart (based on the logic therein) what it assumes would be desired by the user.

In other embodiments, query results may be presented in a map format. For example, FIG. 3C illustrates an example visualization rendering the query results as a map representing area codes in which phone calls were made to the subject of interest, e.g., a particular callee phone number.

In some embodiments, a user may apply or remove a filter to achieve another level of analysis. For example, applying or removing a filter may allow a user to further drill down a dataset, further explore data associated with a subject of interest, reveal relationships between data associated with the subject of interest without focusing on the subject of interest itself, etc. A filter may be a specification of one or more conditions that identifies data to be focused on. For example a filter may be a particular data element(s), range of data elements, type of data element(s), etc.

Figure 4:
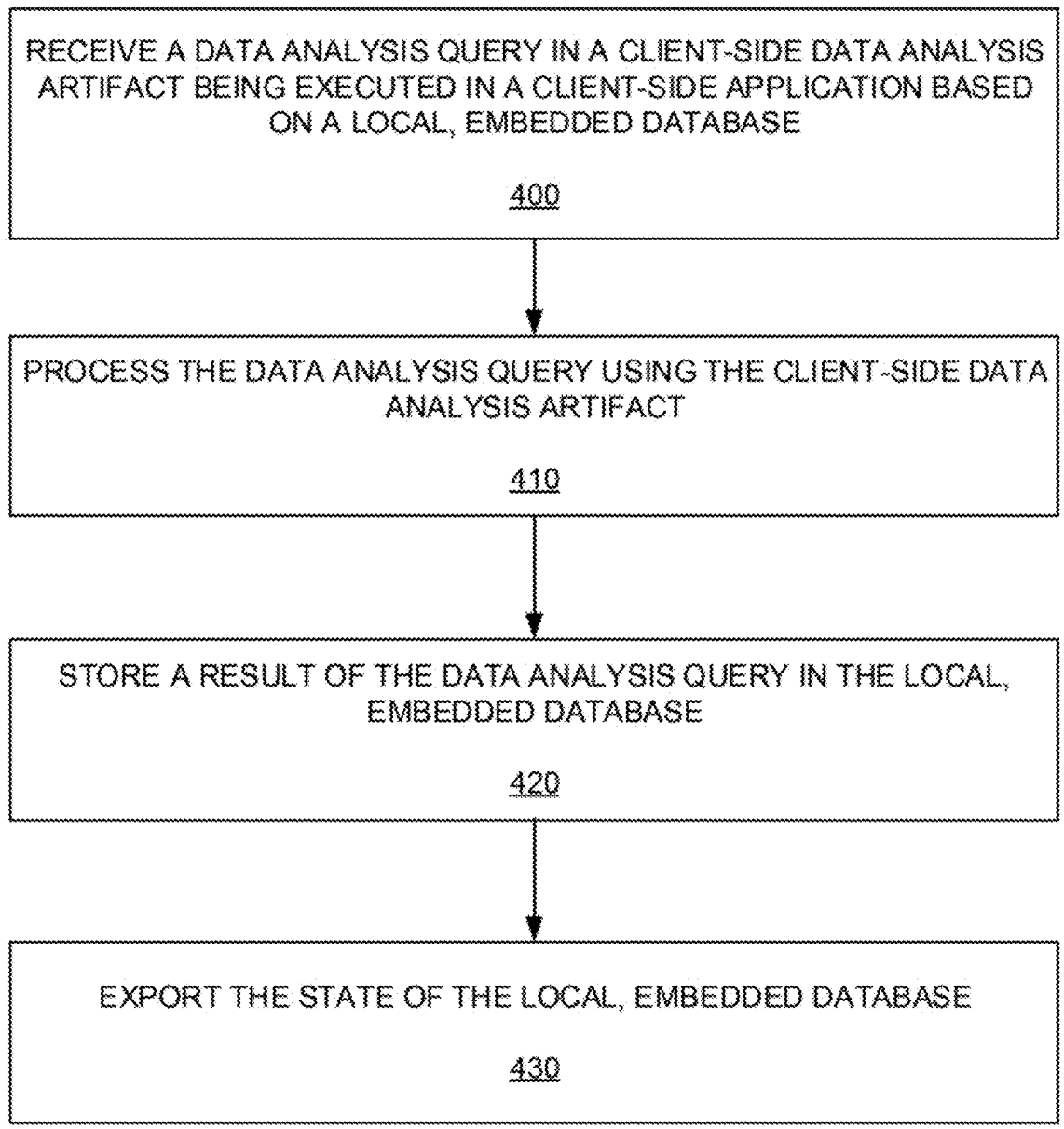
FIG. 4 is a flow illustrating a data analysis process in accordance with one embodiment of the present disclosure.

FIG. 4 illustrates an example process for analyzing data in accordance with one embodiment of the present disclosure. At operation 400, a data analysis query is received in a client-side data analysis artifact being executed in a client-side application based on a local, embedded database. As noted above, various embodiments provide the ability to analyze data in a client-side application without the need for accessing a remotely database/datastore. The local, embedded database may be created using one or more data files, such as CSV-formatted data files that can be translated into a database, such as a SQLite database (or other implementation of a local, embedded database) running on WebAssembly. It should be understood that WebAssembly is merely one example of a low level code scheme that can be used in a client-side application, such as a web browser. For example, the SQLite database can be compiled into WebAssembly and executed in a web browser/web browser tab.

At operation 410, the data analysis query is processed using the client-side data analysis artifact. The client-side data analysis artifact may be some application, program, or code providing a user interface that allows a user to generate/code queries that can be applied to the local, embedded database. That is, the client-side data analysis artifact provides a mechanism for interacting with the local, embedded database to analyze the data therein.

At operation 420, a result of the data analysis query is stored in the local, embedded database. This may be done to preserve a state of the local, embedded database for later use, inquiry, etc. For example, the present state of a dataset can be stored, e.g., after being loaded or implemented as a local, embedded database, after the creation of new tables of data, etc.

At operation 430, the state of the local, embedded database can be exported. For example, an entire serialized output of the local, embedded database in memory can be stored in another file, on a server, etc. The user or another user may then use the new file representative of the stored state of the local, embedded database in another instance of the client-side data analysis artifact.

Example Computer System

Figure 5:
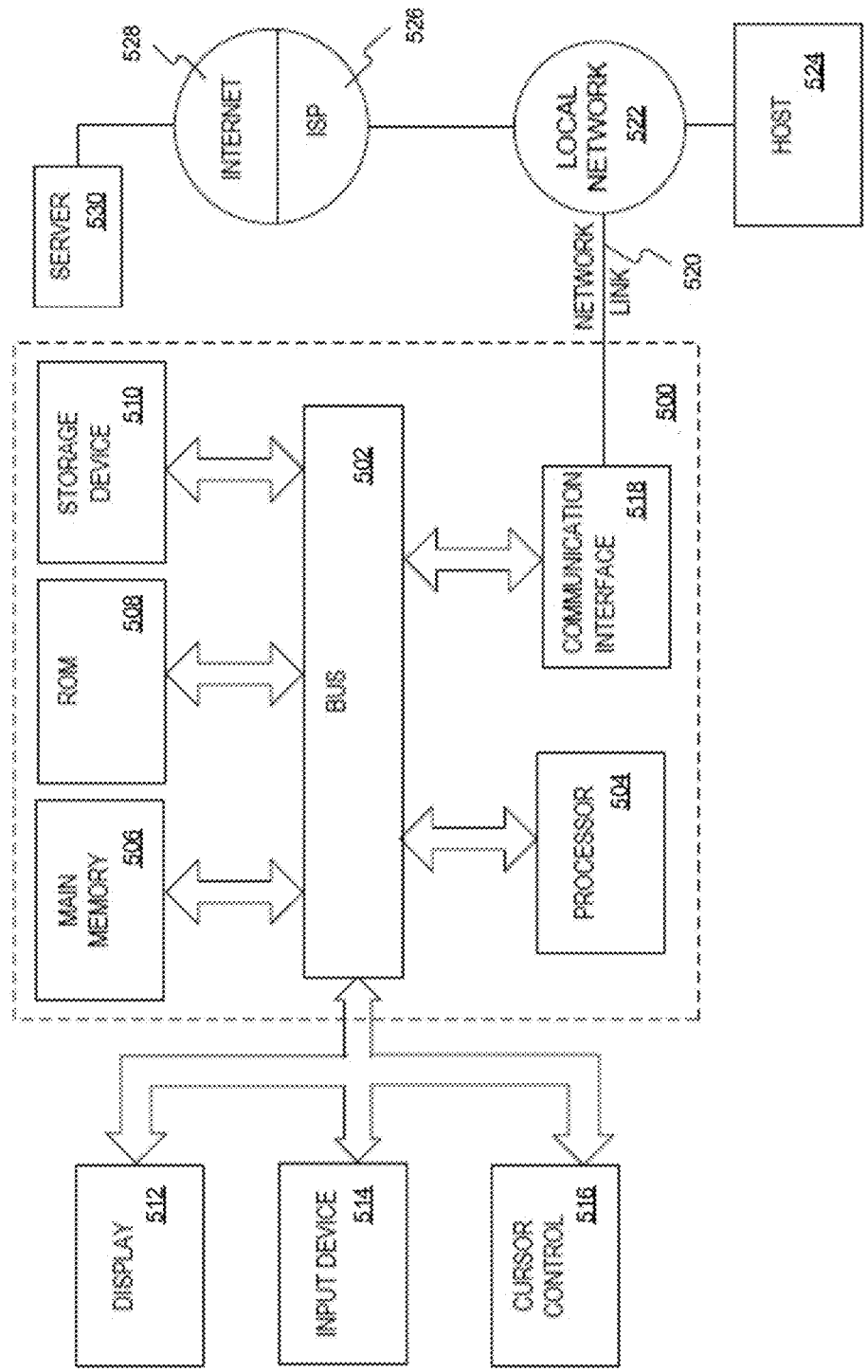
FIG. 5 illustrates a schematic representation of an example computer system in which any of the implementations described herein may be implemented.

FIG. 5 is a block diagram of an exemplary computer system 500 with which embodiments described herein can be implemented, consistent with embodiments of the present disclosure. Computer system 500 includes a bus 502 or other communication mechanism for communicating information, and one or more hardware processors 504 (denoted as processor 504 for purposes of simplicity) coupled with bus 502 for processing information. Hardware processor 504 can be, for example, one or microprocessors.

Computer system 500 also includes a main memory 506, such as a random access memory (RAM) or other dynamic storage device, coupled to bus 502 for storing information and instructions to be executed by processor 504. Main memory 506 also can be used for storing temporary variables or other intermediate information during execution of instructions to be executed by processor 504. Such instructions, after being stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 500 can be coupled via bus 502 to a display 512, such as a cathode ray tube (CRT), a liquid crystal display (LCD), or a touch screen, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computer system 500 can include a user interface component to implement a graphical user interface (GUI) that can be stored in a mass storage device as executable software codes that are executed by the one or more computing devices. This and other components can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "component," as used herein, refers to logic embodied in hardware or firmware, or to a collection of software instructions, possibly having entry and exit points, written in a programming language, such as, for example, Java, Lua, C or C++. A software component can be compiled and linked into an executable program, installed in a dynamic link library, or written in an interpreted programming language such as, for example, BASIC, Perl, or Python. It will be appreciated that software components can be callable from other components or from themselves, and/or can be invoked in response to detected events or interrupts. Software components configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware components can be comprised of connected logic units, such as gates and flip-flops, and/or can be comprised of programmable units, such as programmable gate arrays or processors. The components or computing device functionality described herein are preferably implemented as software components, but can be represented in hardware or firmware. Generally, the components described herein refer to logical components that can be combined with other components or divided into sub-components despite their physical organization or storage.

Computer system 500 can implement the techniques described herein using customized hard-wired logic, one or more ASICs or FPGAs, firmware and/or program logic which in combination with the computer system causes or programs computer system 500 to be a special-purpose machine. According to some embodiments, the operations, functionalities, and techniques and other features described herein are performed by computer system 500 in response to processor 504 executing one or more sequences of one or more instructions contained in main memory 506. Such instructions can be read into main memory 506 from another storage medium, such as storage device 510. Execution of the sequences of instructions contained in main memory 506 causes processor 504 to perform the process operations described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 510. Volatile media can include dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 502. Transmission media can also take the form of acoustic or light waves, such as those generated during radio-wave and infra-red data communications.

Various forms of media can be involved in carrying one or more sequences of one or more instructions to processor 504 for execution. For example, the instructions can initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 can optionally be stored on storage device 510 either before or after execution by processor 504.

Computer system 500 can also include a communication interface 518 coupled to bus 502. Communication interface 518 can provide a two-way data communication coupling to a network link 520 that can be connected to a local network 522. For example, communication interface 518 can be an integrated services digital network (ISDN) card, cable modem, satellite modem, or a modem to provide a data communication connection to a corresponding type of telephone line. As another example, communication interface 518 can be a local area network (LAN) card to provide a data communication connection to a compatible LAN. Wireless links can also be implemented. In any such implementation, communication interface 518 can send and receive electrical, electromagnetic or optical signals that carry digital data streams representing various types of information.

Network link 520 can typically provide data communication through one or more networks to other data devices. For example, network link 520 can provide a connection through local network 522 to a host computer 524 or to data equipment operated by an Internet Service Provider (ISP) 526. ISP 526 in turn can provide data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, can be example forms of transmission media.

Computer system 500 can send messages and receive data, including program code, through the network(s), network link 520 and communication interface 518. In the Internet example, a server 530 can transmit a requested code for an application program through Internet 528, ISP 526, local network 522 and communication interface 518.

The received code can be executed by processor 504 as it is received, and/or stored in storage device 510, or other non-volatile storage for later execution. In some embodiments, server 530 can provide information for being displayed on a display.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system comprising:
one or more processors; and
a memory storing instructions that, when executed by the one or more processors, cause the system to:
translate data files into a local embedded database stored at a client-side application;
execute an instance of a client-side data analysis artifact within the client-side application to analyze the local embedded database without an active network connection to a remote database or a remote server, wherein the instance of the client-side data analysis artifact comprises a browser tab operating in a sandboxed environment;
receive a data analysis query, through the instance of the client-side data analysis artifact, to analyze the dataset;
process the data analysis query using the local embedded database;
store a result of the data analysis query in the local embedded database;
capture a state of the local embedded database including the result of the data analysis query; and
export the captured state of the local embedded database to the remote database or the remote server upon restoration of the active network connection.

2. The system of claim 1, wherein the client-side data analysis artifact comprises a first client-side data analysis artifact; and the instructions, when executed, further cause to the system to:
execute a second client-side data analysis artifact, the second client-side data analysis artifact being executed in a second client-side application, the second client-side data analysis artifact comprising a second local embedded database compiled as an SQLite database.

3. The system of claim 2, wherein the instructions, when executed, further cause the system to:
import, from the remote database or the remote server, the captured state of the local embedded database to the second client-side analysis artifact in response to receiving a user interaction through the second client-side analysis artifact; and
providing the captured state of the local embedded database as the second local embedded database.

4. The system of claim 3, wherein the data analysis query comprises a first data analysis query; and the instructions, when executed, further cause the system to:
receive a second data analysis query;
process the second data analysis query using the second client-side data analysis artifact and the second local embedded database; and
store a result of the second data analysis query in the second local embedded database, wherein a state of the second local embedded database is updated based on the result of the second data analysis query.

5. The system of claim 2, wherein the second client-side data analysis artifact comprises a second instance of the client-side data analysis artifact.

6. The system of claim 5, wherein the second instance of the client-side data analysis artifact is executed in a second web browser tab.

7. The system of claim 1, wherein the instructions, when executed, cause the system to:
export the captured state of the local embedded database to a file on the system.

8. The system of claim 1, wherein the client-side data analysis artifact comprises a data visualization tool adapted to render the result of the data analysis query in at least one of a graphical manner or a tabular manner.

9. The system of claim 7, wherein the instructions, when executed, further cause the system to:
convert the file comprising data to which the data analysis query is applied into the captured state of the local embedded database.

10. A method being implemented by a computing system including one or more physical processors and a storage media storing machine-readable instructions, the method comprising:
translating data files into a local embedded database stored at a client-side application;

executing an instance of a client-side data analysis artifact within the client-side application to analyze the local embedded database without an active network connection to a remote database or a remote server, wherein the instance of the client-side data analysis artifact comprises a browser tab operating in a sandboxed environment;

receiving a data analysis query via a user interface of the instance of the client-side application, to analyze the dataset;

processing the data analysis query using the local embedded database; and generating one or more representations of a result of the data analysis query for presentation through the client-side application.

11. The method of claim 10, wherein the generating the one or more representations of the result of the data analysis query comprises at least one of a textual representation or graphical representation of the result of the data analysis query.

12. The method of claim 10, further comprising:
exporting a current state of the local embedded database to at least one of a local file, the remote server or the remote database, subsequent to processing the data analysis query.

13. The system of claim 1, wherein the instance of the client-side data analysis artifact is executed without accessing a remote database or server.

14. The system of claim 1, wherein the executing an instance further comprises:
in response to processing the data analysis query:
representing the results as a table comprising fields; and
determining a type of graph and a number of divisions of the graph based on a format of one of the fields.

15. A non-transitory memory of a computing system including instructions that, when executed by one or more processors, cause the computing system to:
translate data files into a local embedded database stored at a client-side application;

execute an instance of a client-side data analysis artifact within the client-side application to analyze the local embedded database without an active network connection to a remote database or a remote server, wherein the instance of the client-side data analysis artifact comprises a browser tab operating in a sandboxed environment;

receive a data analysis query, through the instance of the client-side data analysis artifact, to analyze the dataset;

process the data analysis query using the local embedded database;

store a result of the data analysis query in the local embedded database;

capture a state of the local embedded database including the result of the data analysis query; and export the captured state of the local embedded database to the remote database or the remote server upon restoration of the active network connection.

16. The non-transitory memory of claim 15, wherein the client-side data analysis artifact comprises a first client-side data analysis artifact; and the instructions, when executed, further cause to the computing system to:
execute a second client-side data analysis artifact, the second client-side data analysis artifact being executed in a second client-side application, the second client-side data analysis artifact comprising a second local embedded database compiled as an SQLite database.

17. The non-transitory memory of claim 16, wherein the instructions, when executed, further cause to the computing system to:
import, from the remote database or the remote server, the captured state of the local embedded database to the second client-side analysis artifact in response to receiving a user interaction through the second client-side analysis artifact; and
providing the captured state of the local embedded database as the second local embedded database.

18. The system of claim 1, wherein the local embedded database is compiled as an SQLite database.

* * * * *